United States Patent Office 3,485,849
Patented Dec. 23, 1969

3,485,849
PROCESS FOR THE PREPARATION OF IMINO-THIAZOLIDINES
Alain Donche and Claude Thibault, Pau, France, assignors to Societe Nationale des Petroles d'Aquitaine, Courbevoie, France
No Drawing. Filed Dec. 4, 1967, Ser. No. 687,444
Claims priority, application France, Dec. 5, 1966, 86,110
Int. Cl. C07d 91/18; C08d 3/02
U.S. Cl. 260—306.7                    7 Claims

ABSTRACT OF THE DISCLOSURE

Imino-thiazolidines are produced by heating disubstituted carbodiimides, at a temperature of 150° to 250° C., with 1,3-oxathiolan-2-one; the carbodiimides used are disubstituted with hydrocarbyl radicals which are alkyls, aryls, aralkyl or cycloalkyls. The reaction may be accelerated by the use of catalysts such as salts of alkali metals, preferably basic salts, or organic bases. These thiazolidines can be used as sulfurizing agents and as additives for rubbers.

---

The invention relates to a process for the preparation of imino-thiazolidines and more especially of such compounds in which the nitrogen atoms carry hydrocarbyl substituents.

The substituted imino-thiazolidines with which the invention is concerned are heterocyclic compounds having five elements in the ring, of the general formula:

$$\begin{array}{c} \diagdown C - C \diagup \\ {}^5 \quad {}^4 \\ S1 \quad {}_2{}^3N - R \\ \diagdown C \diagup \\ \| \\ N - R' \end{array} \quad (1)$$

in which R and R', which may be the same or different, are hydrocarbyl radicals. These thiazolidines can be used, for example, as sulphurizing agents, such as for example, for the progressive and controlled sulfurization of metals or other materials, and as additives for rubbers.

We have obtained 3-phenyl-2-phenylimino-1,3-thiazolidine by the reaction of N-phenyl-imino-phosgene with 2-anilino-ethane-thiol in a basic medium, with a yield of about 65%, in accordance with the reaction:

$$R-N=CCl_2 + RNHCH_2CH_2SH \longrightarrow \begin{array}{c} H_2C---CH_2 \\ | \quad\quad | \\ S \quad\quad N-R \\ \diagdown C \diagup \\ \| \\ N-R \end{array} + 2HCl \quad (2)$$

However, this reaction makes use of reactants which have to be prepared in advance by relatively costly procedures; thus phenyl-imino-phosgene can be prepared by the chlorination of phenyl isothiacyanate, but this involves substantial losses; similarly, 2-anilino-ethane-thiol is not an easily available starting material, and it has to be produced at a not inconsiderable expense.

In seeking a more economical process, we have found that it is in fact possible to prepare imino-thiazolidines in a more simple and industrially practicable manner, starting with initial materials which can be obtained much more easily. Moreover, making use of our discovery, we have found that generally it is possible to obtain the desired imino-thiazolidine without secondary products.

The process according to the invention consists in causing a disubstituted carbo-diimide to react with 1,3-oxathiolan-2-one.

The reaction which takes place can be represented by the following transformation:

$$\begin{array}{c} H_2C---CH_2 \\ | \quad\quad | \\ S \quad\quad O \\ \diagdown C \diagup \\ \| \\ O \end{array} + R-N=C=N-R' \longrightarrow \begin{array}{c} H_2C---CH_2 \\ | \quad\quad | \\ S \quad\quad N-R \\ \diagdown C \diagup \\ \| \\ NR' \end{array} + CO_2 \quad (3)$$

in which R and R' are the same or different and represent hydrocarbon groups, such as alkyls, aryls, cycloalkyls or aralkyls, for instance.

In the transformation (3), when R and R' are not identical their positions can be reversed: that is to say, in the end-product, R' can be attached to the nitrogen of the ring and R to the external nitrogen.

The economy of the process provided by the invention arises from the fact that ethylene monothiocarbonate is a very easily accessible product, and the carbo-diimide can be obtained fairly easily from an isocyanate of the formula RNCO.

The carbo-diimides which are suitable for carrying out the process of the invention are those in which the radicals R and R' are branched or linear alkyl radicals which may, for example, contain from 1 to 30 carbon atoms; it is possible, in particular, to use carbo-diimides in which the alkyl radicals have from 1 to 8 carbon atoms, more especially methyl, ethyl, propyl, butyl, isobutyl, tert.-butyl, pentyl, hexyl and octyl radicals.

The radicals R and R' can also be aryl radicals; the aromatic nucleus of such radicals, in particular the benzene nucleus, can carry electro-positive or electro-negative substituents, such as for example alkyl radicals, such as methyl, ethyl, hexyl and dodecyl, halogens, in particular chlorine, and such groups as nitro and sulpho. Thus the radicals R and R' can be phenyl, methyl-phenyl, dimethyl-phenyl, ethyl-phenyl, butyl-phenyl, decyl-phenyl and naphtyl, for example. They can also be cycloalkyl radicals, in particular cyclopentyl or cyclohexyl, which may if desired be substituted.

The reaction according to the invention can take place at temperatures of about 150° to 250° C. It can be accelerated by means of catalysts, in which case the preferred temperatures are of the order of 180 to 210° C. At such temperatures the reaction generally lasts about 10 to 120 minutes.

Particularly suitable as catalysts are, for instance, salts of alkali metals, preferably basic salts, and also organic bases, particularly amines, urea and thiourea, which may eventually be substituted. As a non-limitative example, we would mention that alkali metal carbonates can be used with success.

The proportions of the reactants can be stoichiometric, but it is preferable to operate with an excess of 1,3-oxathiolan-2-one, for example, with 1.5 to 3 mols per mol of carbo-diimide.

The following non-limitative examples illustrate the invention.

EXAMPLE 1

15.5 g., i.e., 0.08 mol, of diphenyl carbo-diimide $C_6H_5-N=C=N-C_6H_5$ are heated for 30 minutes with 16.6 g. of 1,3-oxathiolan-2-one (0.16 mol) in the presence of 0.1 g. of sodium carbonate, to a temperature of 200° C.

The crude product obtained is taken up in 200 ml. of ether, and then washed three times, with 50 ml. of 50% hydrochloric acid on each occasion. The aqueous phase is then made alkaline, this leading to the precipitation of 12 g. of 3-phenyl-2-phenylimino-1,3-thiazolidine; this corresponds to a yield of 60% of the said compound. The thiazolidine which is obtained has a melting point of 135° C.

EXAMPLE 2

The 3-phenyl-2-phenylimino-1,3-thiazolidine prepared according to Example 1 has been used in place of mercaptobenzothiazole as accelerator agent in the vulcanization of the copolymers isobutene-isoprene-dimethylfulvene described in U.S. Patent No. 2,628,955 to Charles I. Parrish.

The test has been carried out with a copolymer formed by 96.75% of isobutene, 2.5% of isoprene and 0.75 of 6,6'-dimethyl-fulvene, the percent being by volume, according to Example 5 (columns 8 and 9, and Table II of the above U.S. patent).

The test procedure having been the same which is described in U.S. Patent 2,628,955, the mixtures used were the following ones:

|  | Parts by weight | |
|---|---|---|
|  | U.S. Patent 2,628,955 | Present Example 2 |
| Copolymer | 100 | 100 |
| Zinc oxide | 5 | 5 |
| Stearic acid | 3 | 3 |
| Mercaptobenzothiazole | 0.5 |  |
| 3-phenyl-2-phenylimino-1,3-thiazolidine |  | 0.5 |
| Tetramethyl thiuram disulfide | 1 | 1 |
| Sulfur | 2 | 2 |
| Channel Black (E.P.C.) | 50 | 50 |

The thus vulcanized copolymer showed:

| 300% modulus in kg./cm.²: | | |
|---|---|---|
| After 40 minutes curing at 153° C | 42.4 | 42 |
| After 60 minutes curing at 153° C | 54.5 | 56.2 |
| After 120 minutes curing at 153° C | 65.2 | 69.8 |
| Tensile Strength in kg./cm.²: | | |
| After 40 minutes curing at 153° C | 234 | 230 |
| After 60 minutes curing at 153° C | 227 | 238 |
| After 120 minutes curing at 153° C | 234 | 246 |

We claim:

1. A process for the preparation of an imino thiazolidine of the formula:

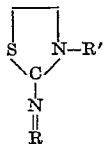

which comprises heating a dihydrocarbylcarbodiimide of the formula R—N=C=N—R' with at least one mole of 1,3-oxathiolan-2-one wherein R and R' are selected from the group consisting of alkyl containing 1 to 8 carbon atoms; phenyl or substituted phenyl wherein the substituents are alkyl containing 1 to 12 carbon atoms, halo, nitro, or sulfo, cyclohexyl or cyclopentyl, at a temperature of between 150° and 120° C.

2. A process according to claim 1 wherein the proportion of 1,3-oxathiolan-2-one is 1 to 3 moles per mole of the dihydrocarbylcarbodiimide.

3. Process according to claim 1, wherein a catalytical amount of an alkali metal salt is added to the reactants before heating.

4. The process according to claim 3, wherein the alkali metal salt is sodium carbonate and the heating is effected at a temperature of 180° to 210° C.

5. A process according to claim 1 which comprises carrying out the reaction until a substantial amount of the iminothiozolidine has formed and separating said iminothiazolidine from the reaction mixture.

6. Process according to claim 5, wherein the imino-thiazolidine is separated from the reaction mixture obtained by treating the mixture with ether, then washing the ether with an aqueous acid solution, and precipitating the imino-thiazolidine from the aqueous solution by rendering the solution alkaline.

7. A process for the preparation of 3-phenyl-2-phenylimino-1,3-thiazolidine, which comprises heating one mole of diphenylcarbodiimide with 1–3 moles of 1,3-oxathiolan-2-one and about 0.001 to 0.1 mole of sodium carbonate, at a temperature of 180° to 210° for about 10 to 120 minutes, then cooling the reaction mixture obtained, treating it with ether, washing the ether with an aqueous acid solution and precipitating the 3-phenyl-2-phenylimino-1,3-thiazolidine performed by rendering said solution alkaline.

References Cited

UNITED STATES PATENTS 3,328,415   6/1967   Surrey et al. _____ 260—306.7

ALEX MAZEL, Primary Examiner

R. J. GALLAGHER, Assistant Examiner

U.S. Cl. X.R.

260—80.7